June 16, 1936.  G. W. WOODS  2,044,556
VIBRATING MAGAZINE FOR APPLYING HARD MATERIAL
Filed July 11, 1935
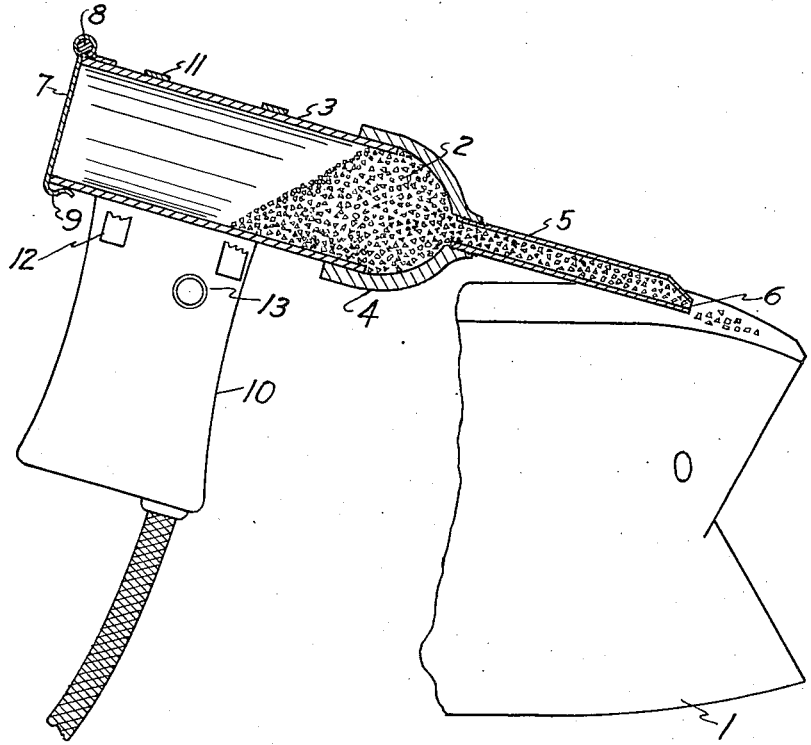
GORHAM W. WOODS, INVENTOR
BY *Jesse R. Stone*
ATTORNEY Patented June 16, 1936

2,044,556

UNITED STATES PATENT OFFICE 2,044,556

VIBRATING MAGAZINE FOR APPLYING HARD MATERIAL

Gorham W. Woods, Houston, Tex., assignor to Hughes Tool Company, Houston, Tex., a corporation of Texas Application July 11, 1935, Serial No. 30,939

3 Claims. (Cl. 221—1)

My invention relates to a device for applying hard facing material such as tungsten carbide to a tool blade.

Granulated tungsten carbide and other similar hard materials called diamond substitutes are extensively employed as a wear resisting facing on cutter blades and the like to prolong the life of the tool. This material is sometimes placed within a tubular container which is melted by the application of a torch or arc and the hard facing and melted tube simultaneously are welded to the face of the tool. But where the addition of other metal than the tungsten carbide is not desired, the tungsten carbide must be placed upon the blade with a ladle, spoon or the like in a slow and cumbersome manner.

I have as an object to provide a device for delivering comminuted hard material to the portion of the cutter desired, so that it may be secured in that position by the application of heat by means of a torch, electric arc or otherwise.

I desire to provide a magazine to contain the hard material, and means connected therewith to deliver the material from the magazine to the work in a uniform stream so that it may be applied in the required amount and welded in position.

I desire to be able to feed the hard material uniformly to the tool to be treated with one hand so that the other hand will be free to use the torch to weld the hard material in place.

In the drawing herewith is shown a central section through a feeding magazine in position, delivering the hard material upon a tool blade.

The use of hard facing material is commonly applied upon well drills and I have shown, in the drawing, a broken section of a fishtail bit 1.

The particles of tungsten carbide 2 are placed within a containing chamber 3, which is shown as cylindrical. At the forward end of the chamber is a swedged nipple 4, the forward reduced end of which is threaded for attachment to a tubular spout 5.

The spout has its delivery end 6 constricted so as to provide an opening which is flattened somewhat to enable the operator to spread the material smoothly upon the work.

The rear end of the container 3 may be closed by a cap 7 which I have shown as hinged at 8 and latched in closed position by a spring latch 9.

To cause vibration of the container, I employ any well known type of vibrator 10 and preferably an electrically operated device, such as may be commonly obtained on the market. This vibrator is housed in a handle-shaped casing attached to the container 3 by straps 11 encircling the container and secured at 12 to each side of the vibrator. There is a push button switch 13 which may be operated to cause the operation of the vibrator, said switch being conveniently placed to be operated by the hand of the operator as he grasps the handle formed by the vibrator 10 as will be readily understood.

The manner in which the device is used will be readily understood from the drawing. The constriction at the outlet of the spout 5 would tend to cause the particles of carbide to bridge over the opening and interfere with the even delivery of the carbide to the work. The vibration given to the container will, however, keep the particles loosely arranged so that they will flow uniformly from the nozzle upon the surface of the work. By moving the nozzle along the blade of the tool to be treated the operator will be able to obtain the proper distribution of the material and obtain the desired quantity of material.

Also, as the container and vibrator are conveniently formed for handling by the operator, the operator will have one hand free for other operations such as welding the material in place.

What I claim as new is:

1. A device of the character described including a portable container for granular material, a spout thereon having a constricted opening, and a vibrator secured to said container to exert a vibration on said container and said material as it is delivered from said opening, a housing for said vibrator, said housing forming a handle whereby said container may be adjusted relative to the work.

2. A device of the character described including a container for pulverized material, a delivery spout thereon, a vibrator secured to said container and operative to vibrate said material as it is delivered from said spout, said vibrator being extended from said container to form a handle therefor in operation.

3. A container for comminuted material, a spout thereon, a nozzle at the end of said spout and a vibrator secured to said container to form a handle therefor.

GORHAM W. WOODS.